United States Patent [19]
Nilssen

[11] Patent Number: 5,146,149
[45] Date of Patent: Sep. 8, 1992

[54] AUTOMOTIVE-TYPE STORAGE BATTERY WITH BUILT-IN CHARGER

[76] Inventor: Ole K. Nilssen, Caesar Dr., Rte. 5, Barrington, Ill. 60010

[21] Appl. No.: 804,780

[22] Filed: Dec. 5, 1985

[51] Int. Cl.$^5$ .............. H02J 7/00; H01M 10/46; H01M 14/00
[52] U.S. Cl. .............................. 320/2; 429/7; 320/21
[58] Field of Search ........................ 320/2–4, 320/48; 361/101; 429/7, 97–100

[56] References Cited

U.S. PATENT DOCUMENTS

| | | | |
|---|---|---|---|
| 2,978,596 | 4/1961 | Robirds | 320/2 X |
| 3,270,267 | 8/1966 | Nolte, Jr. | 320/56 |
| 3,344,899 | 10/1967 | Wang et al. | 320/2 X |
| 3,409,816 | 11/1968 | Foster | 320/2 X |
| 3,525,912 | 8/1970 | Wallin | 320/2 X |
| 3,617,850 | 11/1971 | Domshy | 320/23 X |
| 3,876,921 | 4/1975 | Bigbee, III | 320/20 |
| 3,938,018 | 2/1976 | Dahl | 320/2 |
| 4,021,717 | 5/1977 | Furuishi et al. | 320/21 X |
| 4,081,737 | 3/1978 | Miyahara | 320/2 |
| 4,086,523 | 4/1978 | Izumi | 320/2 |
| 4,109,193 | 8/1978 | Schultheis | 320/2 |
| 4,224,383 | 9/1980 | Taylor | 429/7 |
| 4,234,839 | 11/1980 | King et al. | 320/2 X |
| 4,382,220 | 5/1983 | Marshall et al. | 320/2 |
| 4,423,476 | 12/1983 | Neumann | 320/59 X |

FOREIGN PATENT DOCUMENTS

| | | | |
|---|---|---|---|
| 3201758 | 9/1983 | Fed. Rep. of Germany | 429/7 |
| 3409309 | 6/1985 | Fed. Rep. of Germany | 429/7 |
| 0185308 | 4/1984 | Japan | 320/DIG. 1 |

Primary Examiner—R. J. Hickey

[57] ABSTRACT

An otherwise regular 12 volt 60 Ampere-hour automotive storage battery comprises a built-in automatic electronic inverter-type battery charger.

This built-in battery charger is operable to connect with an ordinary 120 Volt/60 Hz power line by way of an electrical power cord having a male plug at one end and a female plug at the other end—with the male plug being adapted for insertion into an ordinary household electrical outlet and the female plug being adapted for insertion into a recessed male receptacle means mounted on the body of the battery.

When so connected, the built-in battery charger is operable to charge the battery at a six Ampere rate until fully charged. At the point of full charge, charging automatically terminates and is restarted only if the magnitude of the voltage across the battery terminals falls below a predetermined level.

There is complete electrical isolation between the terminals of the recessed male receptacle on the storage battery and the battery power output posts.

The volume occupied by the built-in battery charger is only on the order of four cubic-inches, and can therefore be readily comprised within a sealed enclosure integral with the battery case.

18 Claims, 2 Drawing Sheets

AUTOMOTIVE-TYPE STORAGE BATTERY WITH BUILT-IN CHARGER

BACKGROUND OF THE INVENTION

1. Field of Invention

The present invention relates to electric storage batteries, particularly of the type commonly used in automotive, marine, traction and similar applications.

2. Prior Art

Presently, when having to charge an automotive-type storage battery, there is a danger associated with making the connection between the battery charger and the battery terminals. The danger involves sparking and the possibility that the sparks may ignite flammable gases having previously been generated by the battery.

The situation is particularly dangerous if the connection between the charger and the battery is done incorrectly—that is, if the positive terminal of the charger is connected with the negative terminal of the battery, and vice versa. In such a situation, extremely large current flow results and the associated sparking is particularly severe.

Hence, the process of charging of an automotive-type storage battery with an ordinary battery charger is potentially dangerous and, for many people, also quite intimidating.

SUMMARY OF THE INVENTION

Objects of the Invention

A first object of the present invention is that of providing an automotive-type storage battery that is easy and safe to charge.

A second object is that of providing an automotive-type storage battery that comprises its own built-in charger means.

A third object is that of providing a storage battery that can readily be recharged by way of direct connection with an ordinary 120 Volt/60 Hz power line.

A fourth object is that of providing an automotive-type storage battery having a set of charging terminals that are separate from its regular battery terminals and by which the battery may be safely charged.

A fifth object is that of providing an automotive-type storage battery having a special power input receptacle operative to safely receive power for charging the battery.

These, as well as other objects, features and advantages of the present invention will become aparent from the following description and claims.

BRIEF DESCRIPTION

In the preferred embodiment of the invention, an otherwise regular 12 Volt/60 Ampere-hour automotive storage battery comprises a built-in automatic electronic inverter-type battery charger.

This built-in battery charger is operable to connect with an ordinary 120 Volt/60 Hz power line by way of an electrical power cord having a male plug at one end and a female plug at the other end—with the male plug being adapted for insertion into an ordinary household electrical outlet and the female plug being adapted for insertion into a recessed male receptacle means mounted on the body of the battery away from the regular battery terminals.

When so connected, the built-in battery charger is operable to charge the battery at a six Ampere rate until fully charged. At the point of full charge, charging automatically terminates and is restarted only if the magnitude of the voltage across the battery terminals falls below a predetermined level.

There is complete electrical isolation between the terminals of the recessed male receptacle on the storage battery and the battery's regular terminals or power output posts.

The volume occupied by the built-in battery charger is only on the order of four cubic-inches; and the charger is comprised within a sealed enclosure integral with the battery case.

In overall appearance, subject battery looks like an ordinary automotive-type storage battery except for having a small input receptacle located away from the regular battery terminals. No power can be extracted from this input receptacle.

In an alternative embodiment, instead of having a built-in battery charger, the otherwise ordinary automotive-type storage battery has a built-in charging receptacle located away from (but electrically connected with) the battery terminals. This charging receptacle is operative to receive battery charging current from a battery charging means having a power output plug adapted to mate with the battery's charging receptacle. The battery charging means is itself combined with a power plug and adapted to be directly inserted into and held by an ordinary household electric receptacle.

PROBLEM IDENTIFICATION

The explosion hazard associated with charging automotive-type storage batteries is well known and results mainly from sparks generated in connection with making electrical connections between the battery charger and the battery-to-be-charged. These sparks are particularly severe in situations where the battery charger mistakenly gets connected with the battery-to-be-charged with incorrect or reverse polarity.

However, the explosion hazard is only part of several problems associated with charging an automotive-type storage battery. Other problems are: i) the intimidating nature of the sparking itself; ii) the difficulty of making proper electrical connection between the battery terminals and the battery charger clips; and iii) fire initiation hazard resulting when misconnecting the battery charger.

Prior attempts at mitigating these problems have focused on providing solutions as part of the battery charger. However, it has only been possible to provide partial solutions by way of this approach.

The solutions so far provided as part of the battery charger, while they do significantly lessen fire initiation hazards, have done little or nothing in respect to: i) mitigating explosion hazards, ii) eliminating the intimidation associated with the sparking, and iii) reducing the general difficulty in making good electrical connections between the charger and the battery.

The present invention provides effective solutions to all the problems identified above by way of modifying the storage battery itself. As a result, however, solutions are also provided to several problems which so far have not been recognized as such, namely: i) the general difficulty in finding a suitable location to place the battery charger when charging a battery in a car, especially when this takes place out-of-doors; ii) the extra cost associated with having to provide a set of relatively heavy-gauge charging cables and clips; iii) the corrosion susceptibility of the present type of battery chargers resulting from a safety-mandated requirement of having ventilation slots in the charger housing; iv) the rather substantial weight and bulk of the charger itself; v) the requirement of the charger having to be stored somewhere when not in use; vi) the general non-availability when away from home; vii) the safety-mandated requirement of having to make connection between the battery charger and an electrical outlet by way of a three-wire power cord and three-prong plug; etc.

DESCRIPTION OF THE EMBODIMENTS

Details of Construction

Figure 1:
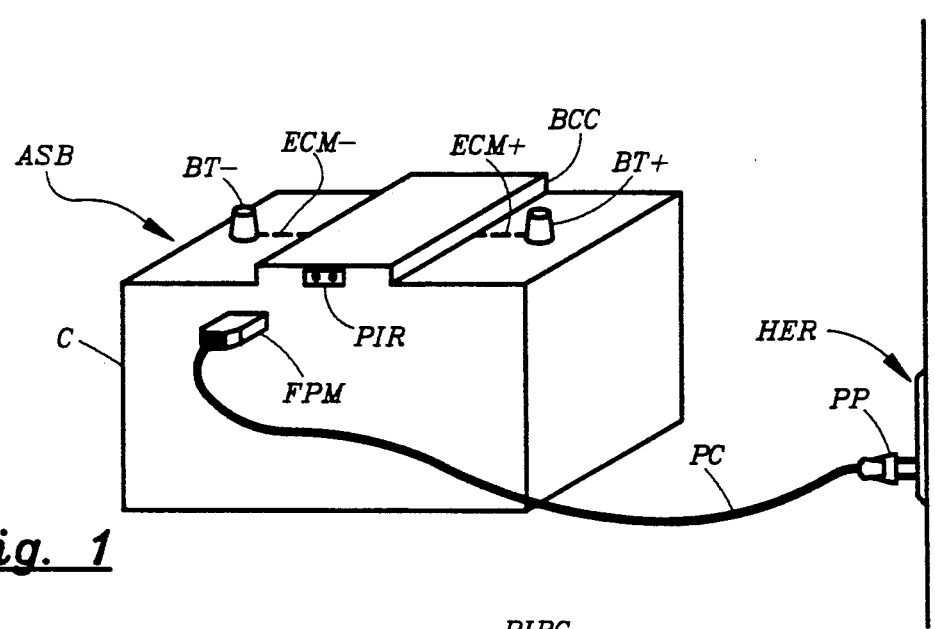
FIG. 1 provides an overall view of the preferred embodiment of the invention.

FIG. 1 shows an overall perspective view of the preferred embodiment of the present invention.

In FIG. 1, ASB is an automotive-type storage battery having a battery charger compartment BCC molded into its otherwise ordinary case C. A recessed two-prong male power input receptacle PIR is located at one side of compartment BCC.

Battery ASB has a positive battery terminal BT+ and a negative battery terminal BT−. An electrical connector means ECM+ extends between the BT+ terminal and compartment BCC; and an electrical connector means ECM− extends between the BT− terminal and compartment BCC.

At one of its ends, a power cord PC has an ordinary two-prong male power plug adapted to make plug-in connection with an ordinary household electrical receptacle HER. At its other end, power cord PC has a two-prong female plug means FPM adapted to make plug-in connection with power input receptacle PIR.

Figure 2:
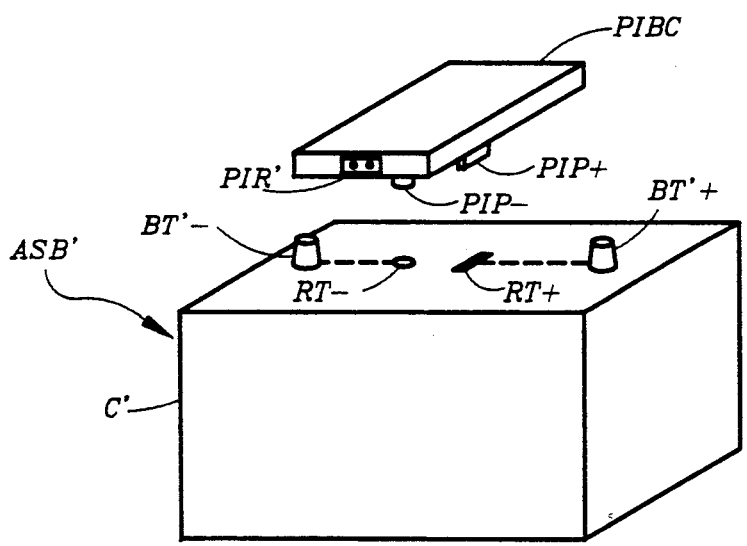
FIG. 2 shows a modification of the preferred embodiment.

FIG. 2 illustrates a situation where battery charger compartment BCC is provided as an entity separate from the battery case.

In FIG. 2, a pop-in battery charger PIBC has a recessed power input receptacle PIR' and is adapted to attach to case C' of automotive-type storage battery ASB' by way of pop-in prongs PIP+ and PIP−. Power input receptacle PIR' is adapted to connect with a power cord such as PC of FIG. 1.

Battery ASB' has a positive battery terminal BT'+ and a negative battery terminal BT'−, as well as a recessed terminal RT+ connected with terminal BT'+ and a recessed terminal RT− connected with terminal BT'−. Recessed terminals RT+ and RT− are polarized and adapted to receive and releasably hold correspondingly polarized pop-in terminals PIP+ and PIP−, respectively.

Figure 3:
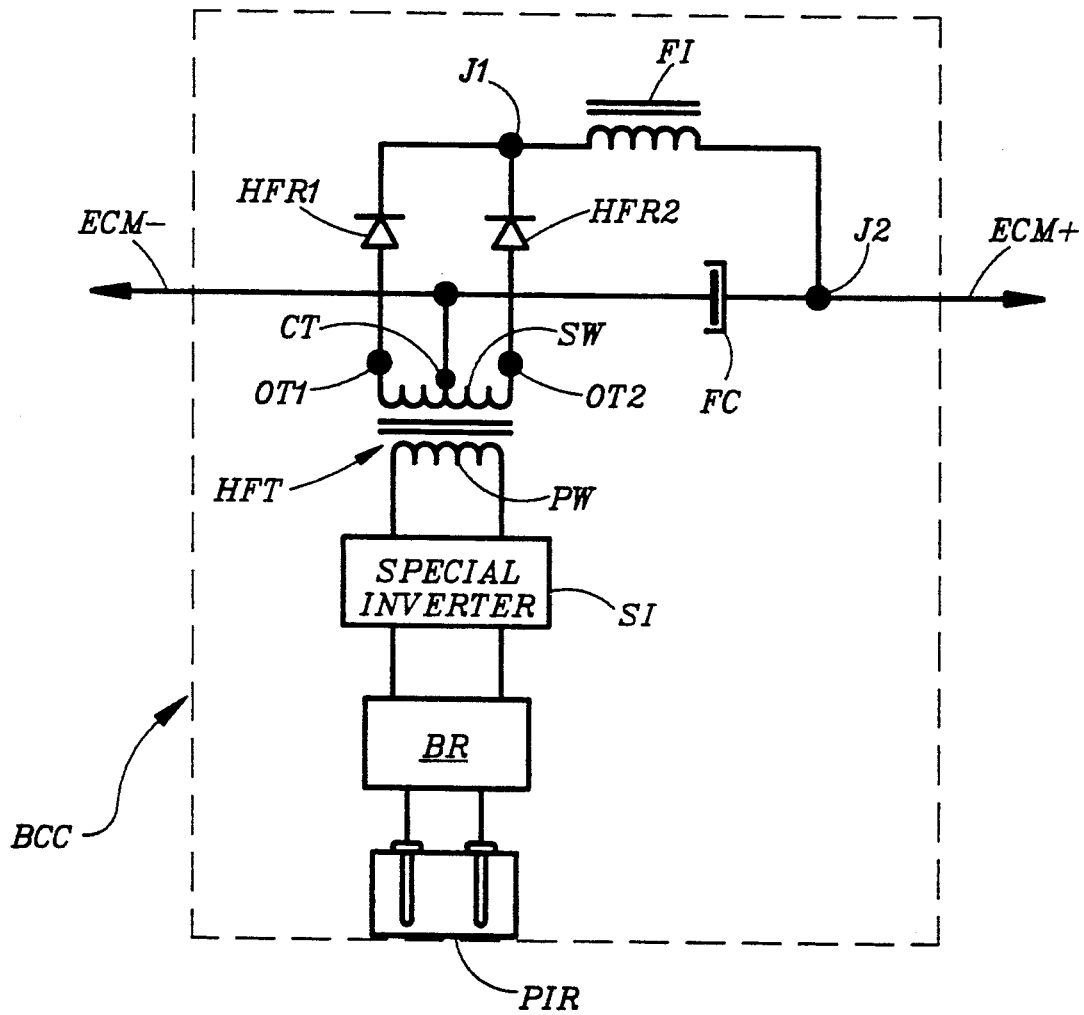
FIG. 3 represents an electric circuit diagram of the preferred embodiment.

FIG. 3 provides a schematic diagram of the inverter-type battery charger means comprised within battery charger compartment BCC.

In FIG. 3, the two terminals of power input receptacle PIR are connected with a bridge rectifier BR. DC voltage output from this bridge rectifier is applied to a special inverter SI, the output from which is an AC voltage of relatively high frequency (about 30 kHz) that is operative to provide a substantially constant-magnitude current up to a predetermined maximum voltage magnitude.

The AC voltage output from inverter SI is applied to primary winding PW of a high-frequency transformer HFT; which transformer has a secondary winding SW with a center-tap CT and output terminals OT1 and OT2; which, respectively, are connected with the anodes of high-frequency rectifiers HFR1 and HFR2.

The cathodes of rectifiers HFR1 and HFR2 are connected together at a first junction J1; and a filter inductor FI is connected between first junction J1 and a second junction J2. A filter capacitor FC is connected between second junction J2 and center-tap CT.

Second junction J2 is connected with electrical connector means ECM+, and center-tap CT is connected with electrical connector means ECM−; which connector means are—in accordance with FIG. 1—connected respectively with battery terminals BT+ and BT−.

Details in respect to the construction of special inverter SI are provided in U.S. Pat. No. 4,554,487 to Nilssen.

Figure 4:
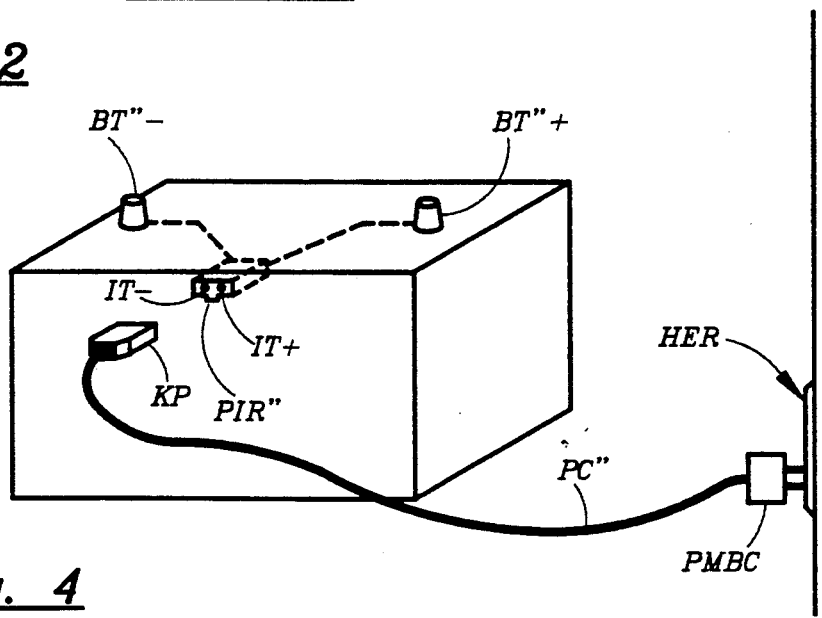
FIG. 4 shows the alternative embodiment of the invention.

FIG. 4 shows an arrangement whereby there is no battery charger comprised within the storage battery; but where instead there is a recessed power input receptacle PIR″ having a positive input terminal IT+ and a negative input terminal IT− connected, directly and respectively, with positive battery terminal BT″+ and negative battery terminal BT″−.

The conductors used for connecting between input terminals IT+/IT− and battery terminals BT″+/BT″− is embedded in the battery casing, thereby providing for electrical insulation of these conductors.

One end of a two-wire power cord PC″ has a keyed plug KP adapted for keyed plug-in connection with receptacle PIR″. The other end of power cord PC″ is connected with the output of a plug-mounted battery charger PMBC that is adapted for insertion into and support by ordinary household electric receptacle HER.

DETAILS OF OPERATION

The operation of the battery of FIG. 1 may be explained as follows.

Whenever battery ASB requires to be recharged, plug means FPM of power cord PC is plugged into power input receptacle PIR; whereafter power plug PP is plugged into a nearby household electrical receptacle HER.

The battery may be located in the engine compartment of a car, or in any other suitable location, and may be left connected with the power line for an indefinite period of time. Charging stops automatically when the battery is fully charged.

Otherwise, battery ASB may be used in the same manner as any ordinary automotive-type storage battery.

The operation of the arrangement of FIG. 2 may be explained as follows.

Prior to charging, pop-in battery charger PIBC—by way of its pop-in prongs PIP+ and PIP−—is pressed into recessed terminals RT+ and RT−; which thereby provides for mechanical fastening of charger PIBC to battery ASB' as well as electrical contact between the output of the battery charger and battery terminals BT'+ and BT'−.

Then, with reference to FIG. 1, whenever battery ASB' requires to be recharged, female plug means FPM of a power cord PC is plugged into power input receptacle PIR'; whereafter the power cord's power plug PP is plugged into a nearby household electrical receptacle.

The pop-in battery charger may be left connected with the battery for an indefinite period of time; and/or, if desired, removed and placed onto another battery.

Otherwise, the operation of the arrangement of FIG. 2 is substantially identical to that of FIG. 1.

The operation of the battery charger arrangement of FIG. 3 may be explained as follows.

About 30 seconds after a 120 Volt/60 Hz voltage from an ordinary electric utility power lien is provided across power input terminals PIR, special inverter SI is triggered into operation and a high-frequency (30 kHz) AC voltage is provided at its output. From that output, as long as the inverter is oscillating, a current of substantially constant magnitude will flow, but only for as long as the magnitude of the output voltage stays below a certain predetermined level. If or when the magnitude of the output voltage reaches or exceeds this predetermined level, the special inverter will be disabled and will remain disabled for a period of about 30 seconds. Thereafter, the inverter will again be triggered into oscillation, but only to be disabled once more if the magnitude of the output voltage again reaches the predetermined level.

Further details of the operation of the special inverter are provided in U.S. Pat. No. 4,554,487 to Nilssen.

The AC voltage output from inverter SI is applied to transformer HFT, the output voltage from which is full-wave-rectified to yield a DC voltage. This DC voltage is filtered by filter inductor FI and filter capacitor FC before being applied to battery terminals BT+/BT− (see FIG. 1) by way of electrial conductor means ECM+/ECM−.

The magnitude of the inverter output voltage is determined by the magnitude of the DC voltage present between battery terminals BT+/BT−; and, the magnitude of the inverter output voltage at which the inverter becomes disabled is so selected as to correspond to the DC voltage present between battery terminals BT+/BT− when the battery is fully charged.

Thus, when battery ASB reaches full charge, inverter SI ceases to provide charging current. However, every 30 seconds or so, the inverter is re-triggered into operation, only to be disabled again if the battery voltage is still high enough to correspond to full charge.

When the battery is fully charged, the amount of charging current provided, by re-initiating the inverter every 30 seconds or so, is negligible; which implies that the battery may be left connected with the power line for an indefinite period without becoming overcharged.

The operation of the arrangement of FIG. 4 may be explained as follows.

The storage battery of FIG. 4 is simply provided with a separate pair of terminals IT+ and IT− comprised within recessed male power input receptacle PIR'', and which are directly connected with the regular battery terminals (BT''+ and BT''−).

Battery charging takes place by connecting keyed plug KP with receptacle PIR'', and by plugging plug-mounted battery charger PMBC into a nearby household electrical outlet.

The battery charger within PMBC is substantially identical with that described in connection with FIG. 3.

Except for the physical arrangement of the battery charger, the operation of the arrangement of FIG. 4 is substantially identical to that associated with the arrangement of FIG. 2.

Just as with the pop-in battery charger PIBC of FIG. 2, the plug-mounted battery charger PMBC of FIG. 4 can only be connected with the battery in such manner as to provide for correct electrical connection between battery charger and battery terminals.

Since the battery charger is inoperative whenever not connected with a load, there will be no sparking associated with plugging keyed plug KP into power input receptacle PIR''—whether or not plug-mounted battery charger PMBC is already connected with the power line.

Moreover, since the connection between battery charger and battery terminals is accomplished by way of a keyed plug and receptacle combination, incorrect or reverse connection is effectively prevented from taking place.

Additional Comments a) In respect to the arrangement of FIG. 4, it is noted that the charging power input to the battery could be provided in the form of a plug-type receptacle at the end of a pig-tail power cord.

b) When the battery is located in the engine compartment of an automotive vehicle, it is particularly convenient to provide a power cord from the battery just long enough to reach outside the engine compartment and therefore operative to permit charging connection with the battery without opening the hood.

c) It is emphasized that the battery charger comprised within the battery of FIG. 1 is contained in a sealed compartment separate from the battery cells. Thus, the charger is completely sealed and can therefore be classified as a double-insulated product; which permits the use of a non-grounded two-wire power cord for connection with the power line.

d) It is re-emphasized that the power input connector PIR'' of FIG. 4 is a keyed entity, thereby being operative to prevent incorrect connection between the battery charger and the battery; which therefore permits simplified construction of the battery charger.

e) By use of the technology described in U.S. Pat. No. 4,554,487 to Nilssen, a 12 Volt/4 Amp battery charger can readily be made small and light enough to be suitable for mounting integrally with a power plug—as indicated in FIG. 4.

f) It is believed that the present invention and its several attendant advantages and features will be understood from the preceeding description. However, without departing from the spirit of the invention, changes may be made in its form and in the contruction and interrelationships of its component parts, the forms herein presented merely representing the presently preferred embodiments.

I claim:

1. In an automotive-type storage battery having a casing and a pair of battery terminals operative to permit connection with a load, the improvement comprising:

inverter means including isolation means; and
charging input terminals means: (i) fastened onto the casing, (ii) physically separated from the battery terminals, (iii) connected in circuit with the battery terminals by way of the inverter means including its isolation means providing for electrical isolation between the charging input terminals means and the battery terminals, and (iv) adapted to receive power from a power source for charging the battery;

thereby permitting the battery to be charged from the power source without having to make direct electrical connection between the power source and the battery terminals; thereby, in turn, preventing a person from getting an electric shock from the power source by touching one of the battery terminals, even though the person may at the same time be in electrical connection with the power source.

2. A storage battery/charger combination having a pair of battery terminals operative to permit connection with a load, comprising:

charging input terminal means located away from the battery terminals and operative to permit connection with a source of electrical power; and electric circuit means connected between the charging input terminal means and the battery terminals, and operative to permit the flow of electric power to the battery terminals from the charging input terminal means while at the same time providing for electrical isolation between the battery terminals and the charging input terminal means; the electric circuit means including inverter means;

thereby permitting the battery to be charged while protecting a person from receiving an electric shock from the source of electric power by touching one of the battery terminals.

3. The storage battery/charger combination of claim 2 wherein the electric circuit means is operative to prevent flow of electric power from the battery terminals to the charging input terminal means.

4. The storage battery/charger combination of claim 2 wherein the electric circuit means is operative to permit the source of electric power to be an ordinary electric utility power line.

5. The storage battery/charger combination of claim 2 wherein: i) the storage battery has a casing, and ii) the charging input terminals means is fastened onto this casing.

6. The storage battery/charger combination of claim 7 wherein the charging input terminal means comprises an electrical receptacle mounted on the casing in a recessed manner and operative to receive and hold an electric plug means.

7. The storage battery/charger combination of claim 2 wherein: i) the storage battery has a casing, and ii) the electric circuit means is contained substantially within this casing.

8. An arrangement comprising:

a storage battery having: i) battery terminals operative to connect with a load, and ii) means operative to mechanically hold and support a special battery charger having charger terminals while at the same time providing for electrical connection between the charger terminals and the battery terminals;

the special battery charger having: (i) charger terminals, (ii) means, including inverter means, operative to connect with a source of voltage of magnitude substantially different from that of the voltage of the storage battery, and iii) means operative to connect with the storage battery such as to be held and rigidly supported thereby while at the same time providing for electrical connection between the charger terminals and the battery terminals.

9. A battery charger: (i) having a pair of charger output terminals, and (ii) being adapted to be powered from an ordinary electric utility power lien by way of a pair of charger input terminals and, by way of the charger output terminals, to charge a storage battery having a pair of battery terminals; the battery terminals being exposed so as to be directly accessible to be touched by a person who may at the same time be in connection with earth ground; there being electrical isolation between the charger input terminals and the charger output terminals; the battery charger comprising:

inverter means connected in circuit between the charger input terminals and the charger output terminals; and support and connect means operative to provide for rigid mechanical attachment of the battery charger to the storage battery, as well as to provide for electrical connection between the battery charger and the storage battery.

10. The battery charger of claim 16 having receptacle means operative to disconnectably make connection with an electric plug on a power cord adapted for connection with the power line;

such that the battery charger may be left connected with and supported by the storage battery even if it is non-connected with the power line, thereby permitting the use of the storage battery for powering a load without interference from the battery charger.

11. The combination of:

an automotive-type storage battery having a pair of battery terminals as well as a charging receptacle means connected with the battery terminals and adapted to receive and hold a charging plug means; the charging receptacle means being an integral part of the storage battery; and battery charger means integrally combined with a power plug means and adapted to be plugged into, held, and powered by an ordinary household electric receptacle, the battery charger means having an output electric cord with a charging plug means operative to be received and held by the charging receptacle means;

the battery charger means being further characterized by including: (i) first rectifier means, (ii) inverter means, (iii) transformer means, and (iv) second rectifier means.

12. In a battery charger having: (i) a case, (ii) power input terminals adapted to be powered from an ordinary electric utility power line, and (iii) DC output terminals, the improvement comprising:

power means connected between the power input terminals and the DC output terminals and including: first rectifier means, inverter means, transformer means and second rectifier means;

prong means connected with the power input terminals; the prong means being mechanically and rigidly combined with the case and operative to be plugged into and held by an ordinary household receptacle; and charging cord means being connected with the DC output terminals; the charging cord means having a plug means adapted for direct plug-in connection with a battery to be charged.

13. A storage battery/charger combination, comprising:

a pair of battery terminals: i) operative to furnish substantially without any intervening impedance all the power available from the storage battery, and ii) directly accessible to touch by the hand of a person;

power input receptacle means operative to receive and hold a power plug means; and battery charger means having power input terminals and DC output terminals, the power input terminals being connected with the power input receptacle means, the DC output terminals being connected with the battery terminals; the battery charger means being further characterized by including inverter means.

14. The storage battery/charger combination of claim 13 wherein the battery charger means is operative to be powered at its power input terminals directly from the voltage present on an ordinary electric utility power line.

15. The storage battery/charger combination of claim 13 wherein there is electrical isolation between the battery terminals and the power input receptacle means.

16. The storage battery/charger combination of claim 13 wherein the battery terminals are directly, rigidly and permanently attached to the storage battery.

17. The storage battery/charger combination of claim 16 wherein the power input receptacle means and the battery charger means are both rigidly and permanently attached to the storage battery.

18. A storage battery having a casing and a pair of battery terminals operative to permit connection with a load, comprising:

inverter means; and charging input terminal means being: (i) mounted in substantially rigid relationship with the casing; (ii) separate of and located away from the battery terminals; (iii) connected with the battery terminals by way of the inverter means; and (iv) operative to receive charging current for charging the storage battery.

* * * * *